United States Patent [19]

Turner et al.

[11] Patent Number: 5,612,791
[45] Date of Patent: Mar. 18, 1997

[54] BOUND DOCUMENT IMAGER WITH AIR JET PAGE TURNING SYSTEM

[75] Inventors: William D. Turner, San Marino; Robert A. Sprague, Saratoga, both of Calif.

[73] Assignee: Xerox Corporation, Stamford, Conn.

[21] Appl. No.: 570,791

[22] Filed: Dec. 12, 1995

[51] Int. Cl.$^6$ .................................................. H01L 27/14
[52] U.S. Cl. .......................................... 358/497; 358/498
[58] Field of Search .................................. 358/497–498, 358/474; 355/25, 308; 271/191, 193, 195

[56] References Cited

U.S. PATENT DOCUMENTS

| | | | |
|---|---|---|---|
| 3,484,970 | 12/1969 | Berlinsky et al. | 40/104 |
| 3,550,296 | 12/1970 | Castagna | 40/104 |
| 3,888,584 | 6/1975 | Smith | 355/75 |
| 4,208,123 | 6/1980 | Stevenson | 355/25 |
| 4,663,873 | 5/1987 | Shinbrot | 40/531 |
| 4,673,286 | 6/1987 | Shinbrot | 355/25 |
| 4,693,594 | 9/1987 | Garavuso et al. | 355/25 |
| 4,780,977 | 11/1988 | Howard et al. | 40/531 |
| 4,916,839 | 4/1990 | Nakanishi | 40/475 |
| 5,017,989 | 5/1991 | Street et al. | 357/30 |
| 5,325,213 | 6/1994 | Takahashi et al. | 358/474 |
| 5,359,207 | 10/1994 | Turner | 257/81 |

Primary Examiner—Stephen Brinich

[57] ABSTRACT

An apparatus for imaging books or other bound documents with minimal stress being applied to the book structure, and for successively imaging and turning pages of a book by means of an air jet system. The book imager includes a support, for placement of a book in an open position, an imager having opposed imaging surfaces capable of simultaneously imaging the entire exposed, facing adjacent pages of the book in a distortion preventing manner, and an air jet page turning system. The support and the imager are relatively movable toward and away from one another, from a first position in which imaging is effected, to a second position in which page turning is effected. The air jet page turning system includes a fluffing jet for separating pages, a pick-off jet for separating the topmost page from the fluffed pages, a force applying jet for urging the topmost page into intimate contact with the imaging device and a page turning jet for driving the topmost page to the opposite side of the book.

18 Claims, 9 Drawing Sheets

BOUND DOCUMENT IMAGER WITH AIR JET PAGE TURNING SYSTEM

FIELD OF THE INVENTION

The present invention relates to an apparatus for simultaneously imaging both pages of an open book or other bound document, with minimal stress being applied to the book structure, and for successively imaging and turning pages of the book without the need for manual intervention. More particularly, this invention relates to the use of a plurality of air jets appropriately directed and timed for turning pages, urging pages against an imager, and releasing the pages from the imager.

BACKGROUND OF THE INVENTION

The technology relating to the reproduction of documents has consistently advanced over time. At present, the traditional light lens copier utilizes xerographic means to automatically reproduce large quantities of stacked paper at a rate of over 100 pages per minute. Current printing technology, at comparable speeds, employs raster output scanning means to output a stored image, in digital form, onto a recording medium by way of various marking technologies, e.g. by electrostatographic reproduction or inkjet printing. Scanning technology, as well as the more recently evolving 2-dimensional imaging array technology, converts an original document image into digital form, which digital data may then be transferred to a digital printer for output onto a recording medium, such as paper.

While the process of reproducing stacked documents has advanced rapidly, the process of reproducing multiple successive pages of a book or other bound volume of pages has inherent limitations that have prevented comparable advances. A primary limitation of bound document reproduction is the requirement of manual intervention for turning individual pages of the book during the reproduction process. This manual intervention is a significant demand on both manpower and time. With the traditional copier or scanner, stress is applied to the book from the constant handling of the book by the user. The user must repeatedly lift the book from the flat imaging surface and turn the individual book pages, so that subsequent pages or sets of pages may be reproduced. Additional stress is applied to the binding when the book is fully laid open in a substantially flat position against a platen. Furthermore, in an attempt to minimize the amount of distortion that often appears on the reproduced image in the binding region of the pages, the user will often apply yet an additional force to the spine of the book in order to flatten the pages against the imaging surface. These stresses to the book are particularly hazardous to older and/or historical volumes of books.

In order to alleviate the stress applied to the bindings, the platen has been moved to the edge of the cabinet, allowing the book to remain in a relaxed state while being imaged, as illustrated in Smith, U.S. Pat. No. 3,888,584, .

Solutions to the manual page turning problem, have looked to automatic page turning mechanisms. Typical of these are:

Berlinsky et al, U.S. Pat. No. 3,484,970, in which a book is laid flat upon a support and an automatic sheet turner using a rotating vacuum head grabs a page and flips it from one side to the other side. Subsequently, a brush follows the path of the roller, sweeping and smoothing out the turned page.

Castagna, U.S. Pat. No. 3,550,296, in which a book is held partially open upon a support and a page turner device, including a suction arm, is used to lift and flip the pages. A constant vacuum force applied through the arm initially causes the page that is to be turned to be lifted. Thereafter, the angular movement of the arm while moving the page to the opposite side of the book, causes the page to disengage from the arm and fall to its respective turned position.

Howard et al, U.S. Pat. No. 4,780,977, in which a book is laid flat upon a support and a page turning apparatus including an arm having a vacuum associated therewith turns the pages.

Nakanishi, U.S. Pat. No. 4,916,839, in which a book is laid flat upon a support and a mechanical means for applying friction to a page to be turned, in combination with air, is used to form a buckle in the page. A sliding plate surface in contact with the buckled page is used to complete the page turning function.

It is also known to provide page turning mechanisms for books in combination with optical systems for capturing the page images. Typical of these are:

Shinbrot, U.S. Pat. No. 4,663,873, in which an electrostatographic copier incorporates a device for turning pages of an open book. The book is laid flat on a support and an air jet initially separates the pages. A vacuum wheel then picks up the separated page and then flips the page to the opposite side of the book. The book is lowered to turn its pages and is then urged into contact with a glass plate for imaging.

Shinbrot, U.S. Pat. No. 4,673,286 and Garavuso et al, U.S. Pat. No. 4,693,594, in which an electrostatographic copier has a device for turning pages of an open book which is laid flat in a page down position on a moving surface relative to an optical system.

In each of these mechanisms (with the exception of Castagna) the book is fully laid open in a substantially flat position. This may be satisfactory if the book lies substantially flat in a relaxed manner. However, if forced into this position, there is a high likelihood that the binding may be stressed and damaged. Also, in this position, the quality of reproduction may be severely impaired because when the book is laid flat, the bulk in the pages adjacent the binding will lie curved, and not flat, thus distorting the optical depth of field. If the distortion is too great, it is likely that an incomplete image will be formed.

The objects of the present invention are to overcome the problems of the known book imagers and to provide an apparatus which will allow book pages to be turned and positioned relative to an imaging device for accurate, high resolution reproduction, and then to be released from the imaging device rapidly and automatically, without manual intervention, and with no structural damage to the book itself.

SUMMARY OF THE INVENTION

These objects are accomplished, in one form, by the present invention which includes a book imager having a support upon which a book may be positioned in a partially open, relaxed, state with minimal stress being applied to the book structure. An imaging device having a pair of imaging surfaces, each of which is capable of capturing a two-dimensional digital representation of a page, is moved by a drive assembly from a first position to a second position, such that in the first position, said imaging device is located in close proximity to the support to enable imaging of at least one page of the book, and in the second position, the imaging device is located sufficiently remote from the support to enable a page of the book to be turned. An air jet page turning system lifts a page, urges it against the imaging device and then drives the page to the opposite side of the book where the opposite side of the page may be imaged together with the front side of a new page.

DETAILED DESCRIPTION OF DRAWINGS

This application is related to copending application entitled "Bound Document Imager With Page Turner", in the names of William D. Turner, Robert P. Kowalsky and Sven E. Karlsson, commonly assigned with the present invention, and identified by Attorney Docket No. D/93191, of U.S. application Ser. No. 08/570,880.

Figure 1:
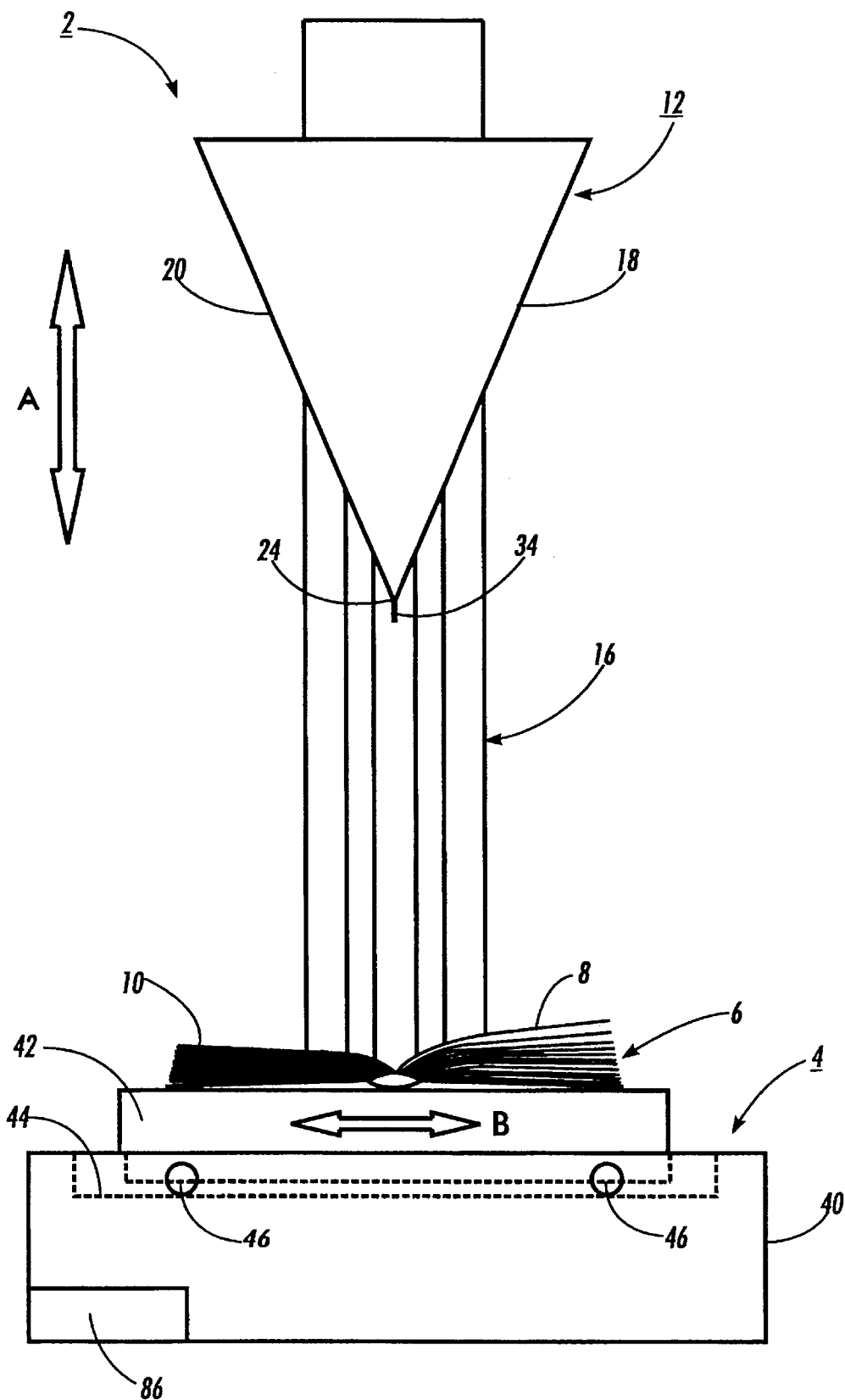
FIG. 1 is a front elevational view of a book imager apparatus.

Turning now to FIG. 1, there is illustrated a bound document imager 2 of the present invention (hereinafter referred to as "book imager"). For the purposes of the present description, the term "book" is used and is intended to include, not only books having either a hard cover or a soft cover, but also periodicals, manuscripts, and any other compilation of bound or joined pages. Additionally, the term "image" or "imaging" is intended to include any manner of digital image capture known in the art, which enables subsequent image reproduction or image manipulation.

The book imager 2 includes a support base 4 upon which a book 6 rests in an open position with exposed pages 8 and 10 facing upward. Although the book is shown lying flat, it may be desired to rest the book in a relaxed, slightly bent orientation so as not to apply stress to the binding. An imaging device 12 capable of simultaneously capturing the images of both pages is positioned above the support base 4. A drive assembly 14 (see FIG. 3), housed in upright standard 16, is provided to raise and lower the imaging device 12 with respect to the support base 4, as indicated by arrow A, from a position in which the imaging device and the support base are proximate, to a position in which they are remote. A page turning assembly shown in FIGS. 4 through 13 is provided to turn page 8 over page 10 so that a successive set of pages may be exposed and positioned to be imaged.

Figure 2:
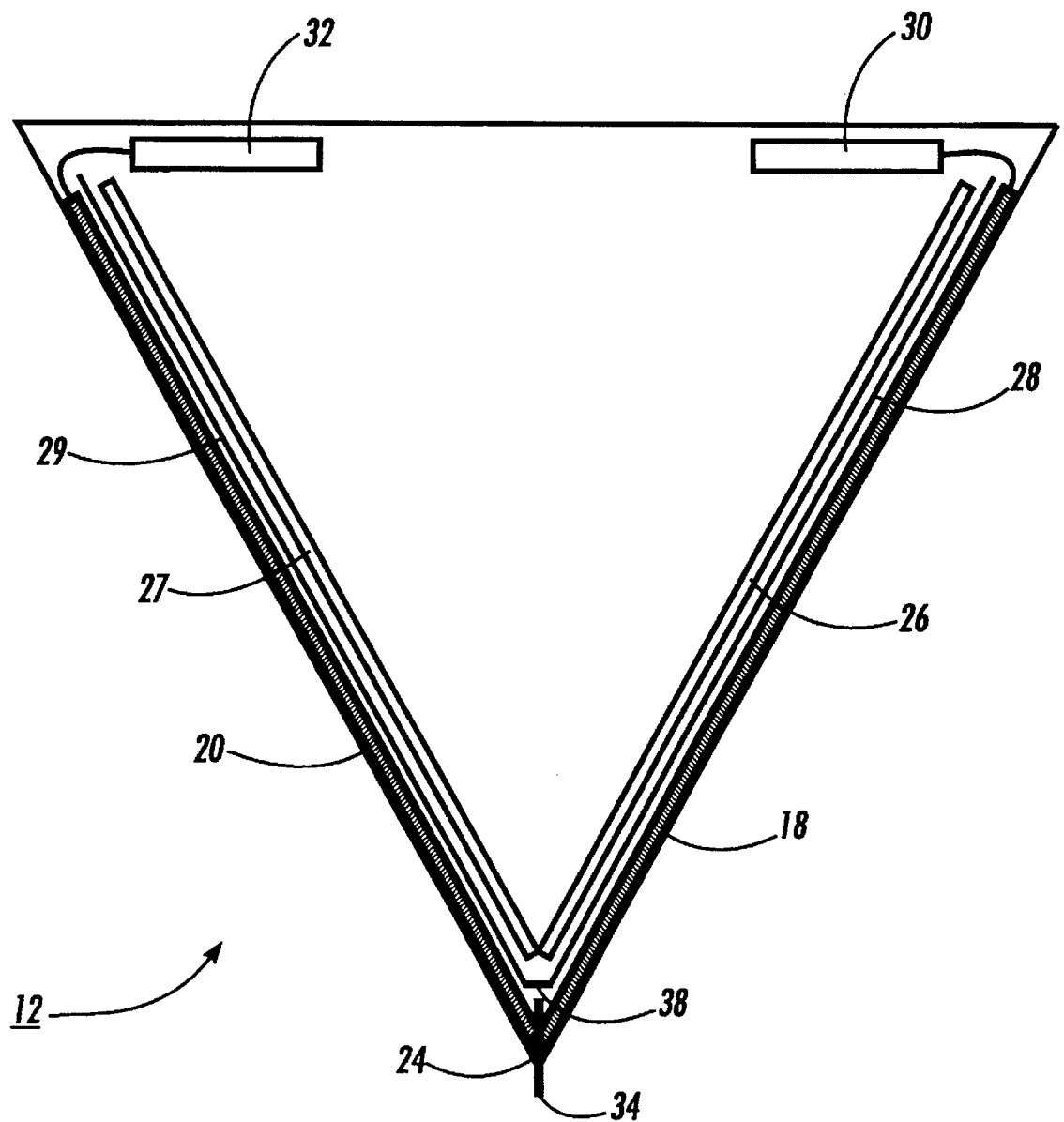
FIG. 2 is a side sectional view taken through the imaging device of the book imager.

As illustrated in FIG. 2, the imaging device 12 incorporates a pair of flat panel detector arrays 18 and 20 capable of substantially simultaneously imaging both of the exposed pages 8 and 10. Each of the detector arrays comprises a thin glass substrate sheet upon which are formed an array of thin film transistors and sensors that function as pixel element detectors. The arrays are disposed in a wedge configuration, meeting at a common edge 24. An exemplary wedge-shaped imaging device, incorporating two-dimensional detector arrays comparable to those of the present invention, is described in U.S. Pat. No. 5,359,207 issued to Turner, and is hereby incorporated by reference. Detector arrays of this type advantageously are able to capture an image without moving mechanical parts. An exemplary two-dimensional detector array comparable to that in use in the present invention, is described in U.S. Pat. No. 5,017,989 issued to Street et al and in U.S. Pat. No. 5,079,426 issued to Antonuk et al, both of which are also hereby incorporated by reference.

Disposed within the imaging device 12 are illumination sources 26 and 27, such as planar electroluminescent (EL) lamps commercially available through Loctite Luminescent Systems, Inc., provided for illuminating the images on pages 8 and 10 through the detector arrays. A thin layer of light diffuser material 28 and 29, such as plexiglass, may be sandwiched between and in contact with the detector arrays 18 and 20 and EL lamps 26 and 27 to improve light uniformity. Alternatively, the pages could be illuminated through the detector arrays by a combination of translucent blocks, suitable light sources, and suitable optics, whereby light beams emanating from the lights enter the translucent blocks and are reflected along the translucent blocks which cause diffuse light to be emitted over the entire area of the detector array. As a further alternative, a standard backlighting arrangement as used in current liquid crystal displays may also deliver reasonably diffused lighting for the purposes of the present invention.

The addressing and read-out interconnects, schematically illustrated as blocks 30 and 32 are coupled to each detector array 18 and 20, respectively, along one edge. As the wedge apex edge 24 is free of interconnects, it is possible to fabricate the pixel element detectors on the substrate close to that edge, maximizing the imaging surface of the array. This feature is particularly advantageous for obtaining a complete image of the page adjacent the spine.

A position sensor 34, located at the wedge apex edge 24, extending beyond the imaging device 12, is retractable therein upon interference with the book 6 as the imaging device is driven towards the book by the drive assembly 14. When the position sensor actuates switch 38 a signal is generated to arrest movement of the drive assembly. It should be understood that the present invention is not limited to the sensor described, and that any suitable sensor may be used, such as, for example, a magnetic or capacitive proximity sensor, or an optical detector. Furthermore, the position sensor may be located anywhere the described sensing function can be accomplished.

Referring again to FIG. 1, the support base 4 comprises a stationary base 40 and a carriage 42 supported thereon in a seating cavity 44. Rollers 46 on carriage 42, enable its lateral movement within the seating cavity 44, in the direction of arrow B. The book 6 lies upon the upper surface of carriage 42 and is positioned so that the spine of the book is substantially aligned with the wedge apex edge 24 of imager 12. To this end, suitable aligning indicia or alignment tabs may be provided on the upper surface of the carriage to insure alignment.

Figure 3:
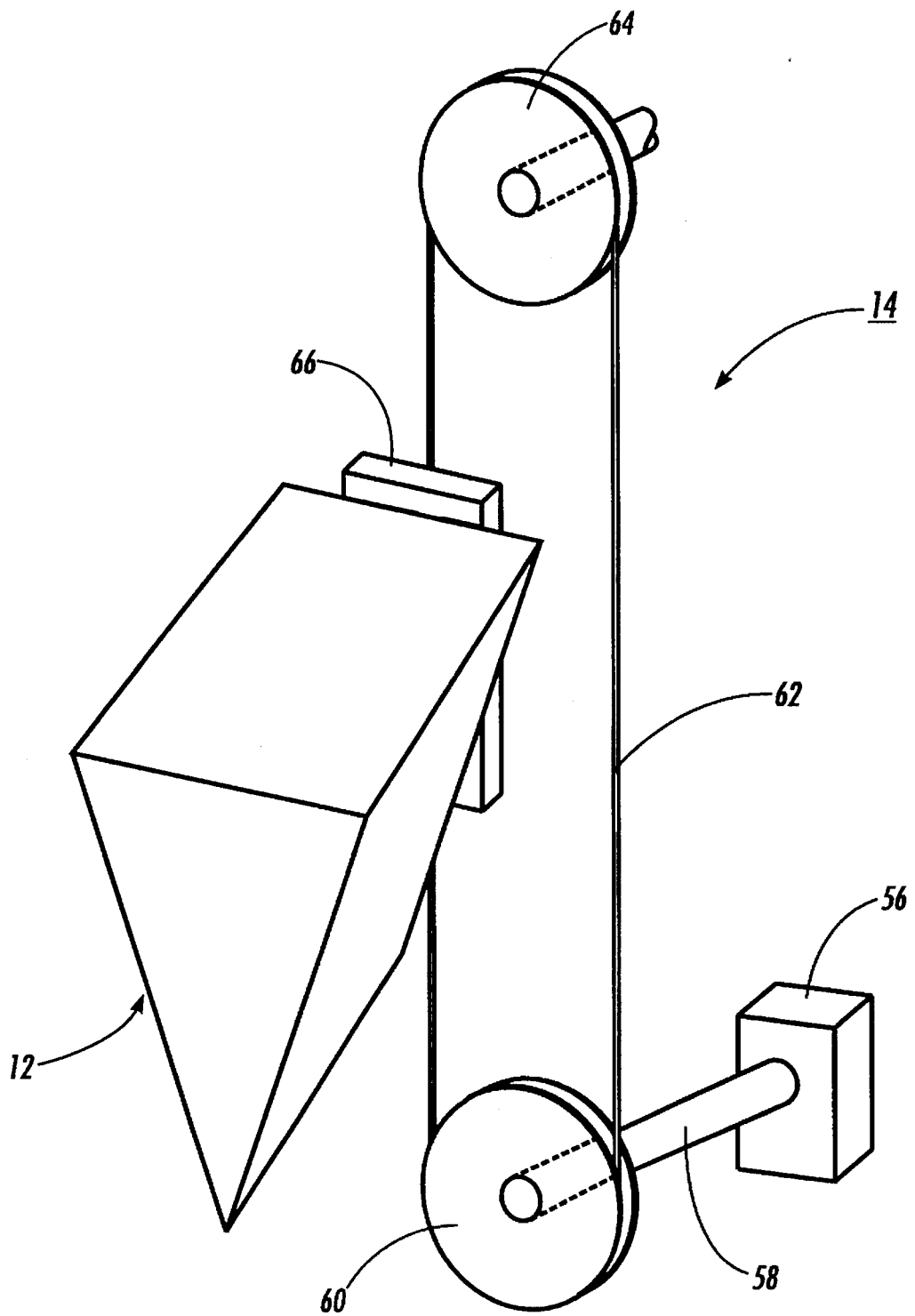
FIG. 3 is a schematic perspective view of the drive assembly of the book imager.

As illustrated in FIG. 3, the drive assembly 14 is operatively associated with the imaging device 12 to impart vertical relative movement between the imaging device and the support base 4. Drive assembly 14 includes a motor 56, preferably a reversible stepper motor, having a drive shaft 58 on which is secured drive gear 60. A chain 62 is in engagement with drive gear 60 and idler gear 64. The imaging device 12 is affixed to a mounting plate 66, fastened to the chain 62, so that the imaging device 12 may be reciprocally driven in a vertical direction between the, lower, imaging position and the, upper, page turning position. It should be understood that any suitable driving mechanism can be used to move the imaging device, as shown, to move the support base relative to a stationary imaging device, or to move both the imaging device and the support base.

Figure 4:
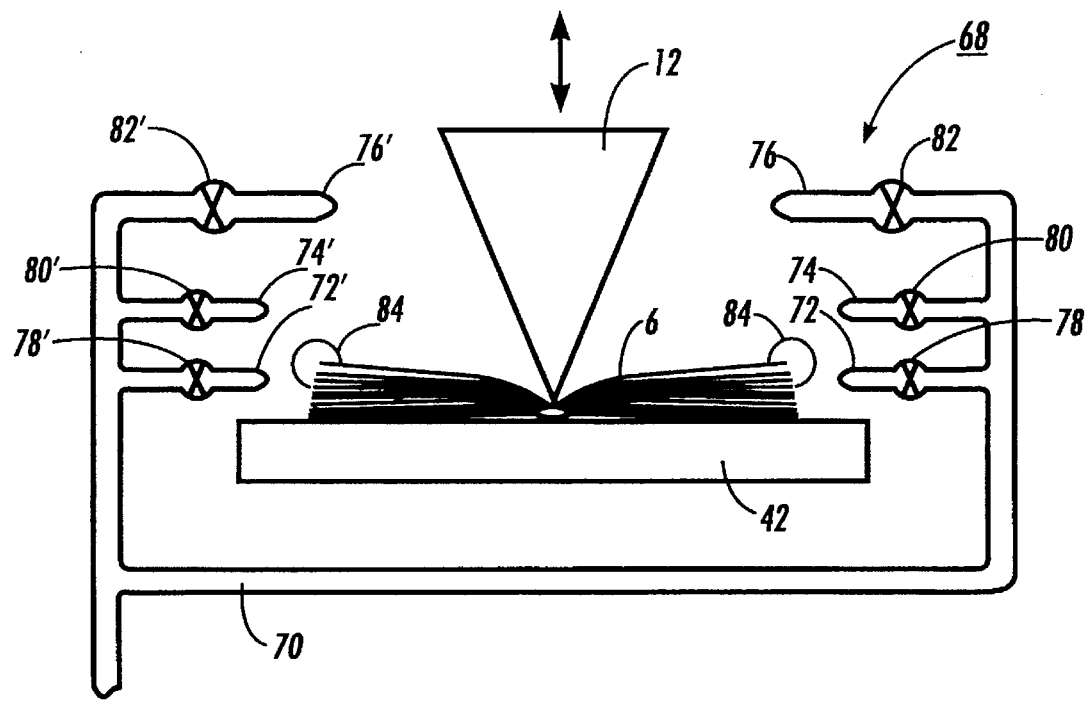
FIGS. 4 through 10 are schematic representations of the air jet page turning system of the present invention.

Page turning assembly 68, as illustrated in FIG. 4 includes an air manifold 70 connected to a source of pressurized air at about 20 psi. The manifold delivers pressurized air to a series of air nozzles 72, 72', 74, 74' and 76, 76', each controlled by a valve 78, 78', 80, 80' and 82, 82' activated in a timed sequence. As shown, the nozzles are symmetrically located on the right side (72, 74, 76) and left side (72', 74', 76') of the book 6, as viewed in FIG. 4, and direct air jets toward the book and the imaging device 12. Nozzles 72 and 72' serve as an air knife to fluff, or separate, the pages of the book. Nozzles 74 and 74' serve to pick off the topmost page and to move it towards the imaging device, and nozzles 76 and 76' serve to urge the page into conformance with the surface of the detector arrays 18 and 20 of the imaging device. Additionally, nozzle 76 serves to complete the page turning operation. A pair of optical sensors 84 and 84' are positioned to detect the outermost edge of the pages and to generate a signal indicative of the magnitude of separation of the pages as they are fluffed by air knife nozzles 72 and 72'. The imaging device is raised and lowered in a timed sequence, in conjunction with the timing of the control valves.

A controller 86 housed in the stationary base 40 is operatively connected to all the drive members, the sensing members the imaging members and the control valves to govern the operation of this apparatus. An example of a suitable controller for providing high speed clocks and automatic up and down ramping of the apparatus stepper motors is Mitsubishi Programmable Controller, FX-16MT-ESS-PLC.

As the pages are turned, from the right side of the book to the left side, its interpage axis shifts toward the right across the spine of the book. Thus, as the imaging device approaches the book, its wedge apex edge 24 would not align with the interpage axis and contact would be made with one of the pages along its curvature adjacent the axis. The lateral component of the downward force exerted by the imaging device 12 will drive the book and the carriage 42 incrementally in a lateral direction to self align the edge 24 with the inter-page axis. This will occur automatically as the pages of the book are turned, as the location of the inter-page axis incrementally laterally traverses the spine.

Figure 5:
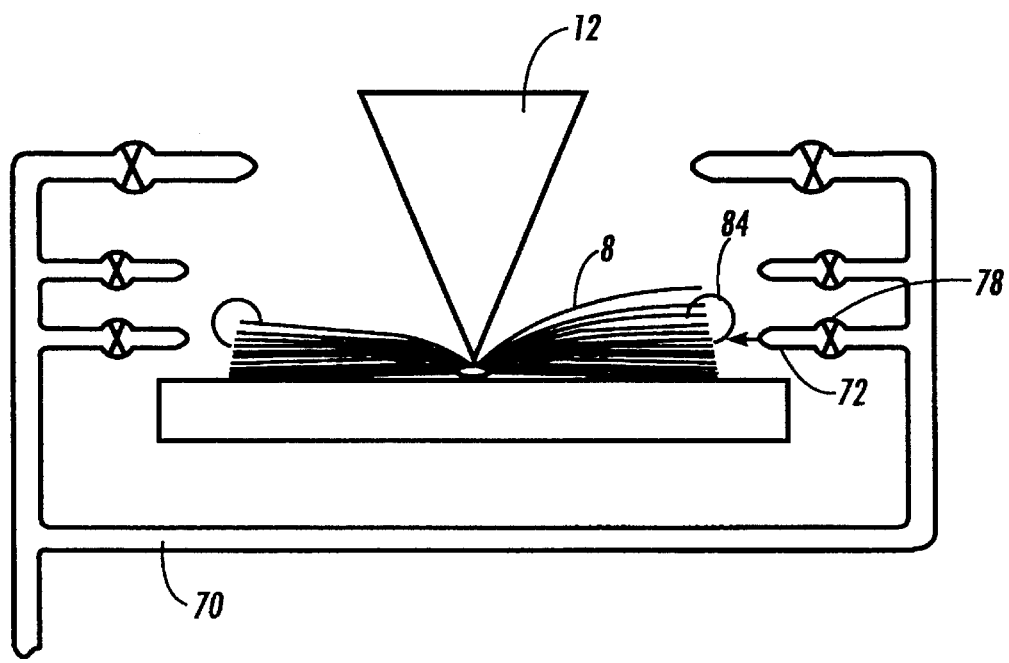
Figure 6:
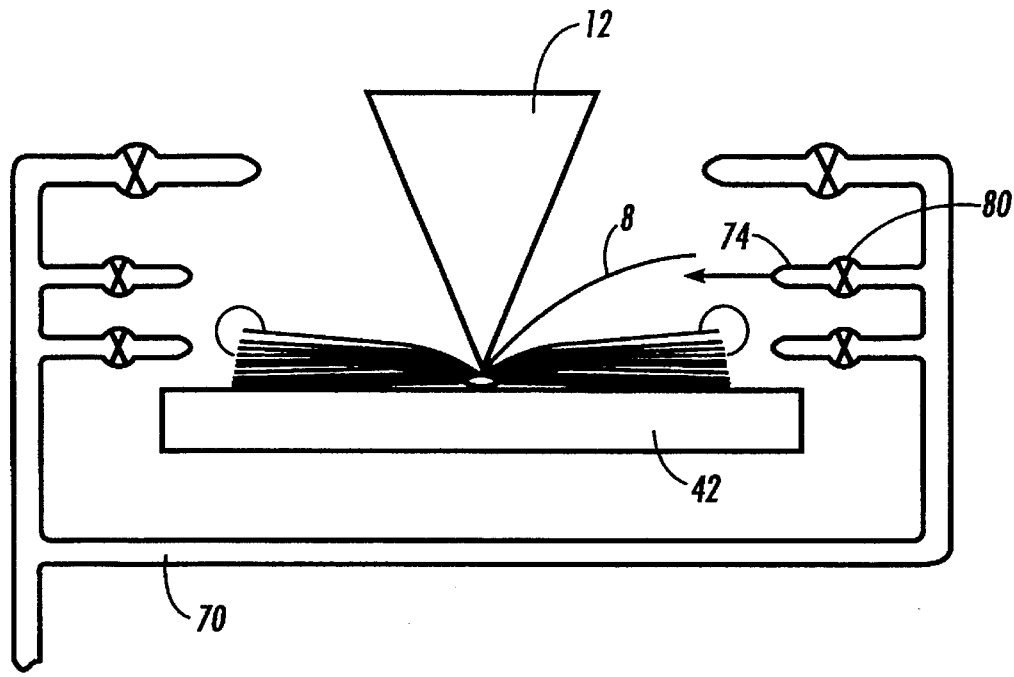
Figure 7:
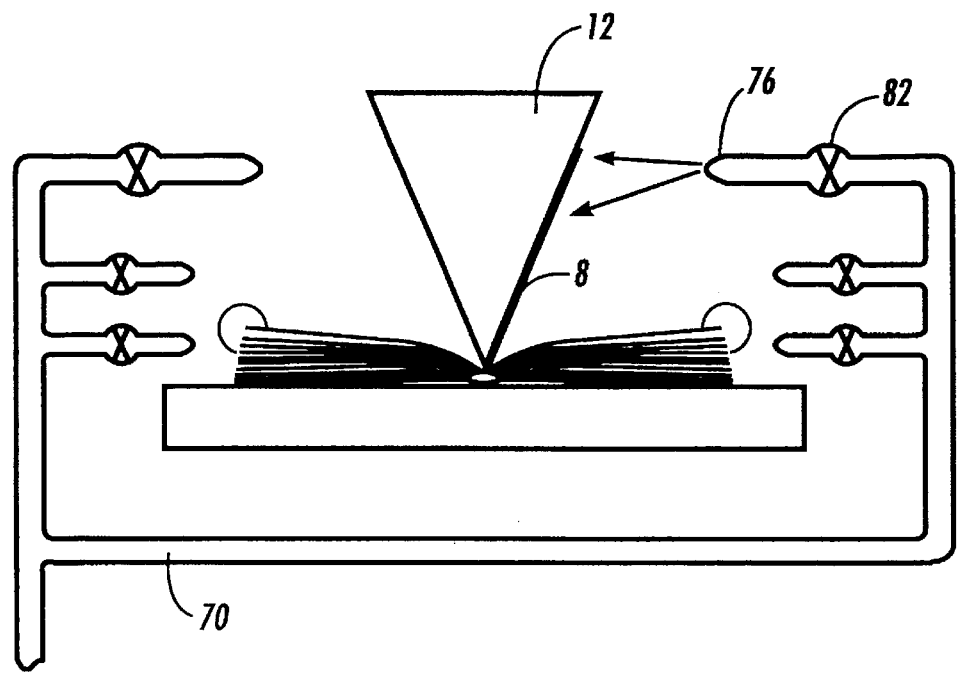
Figure 8:
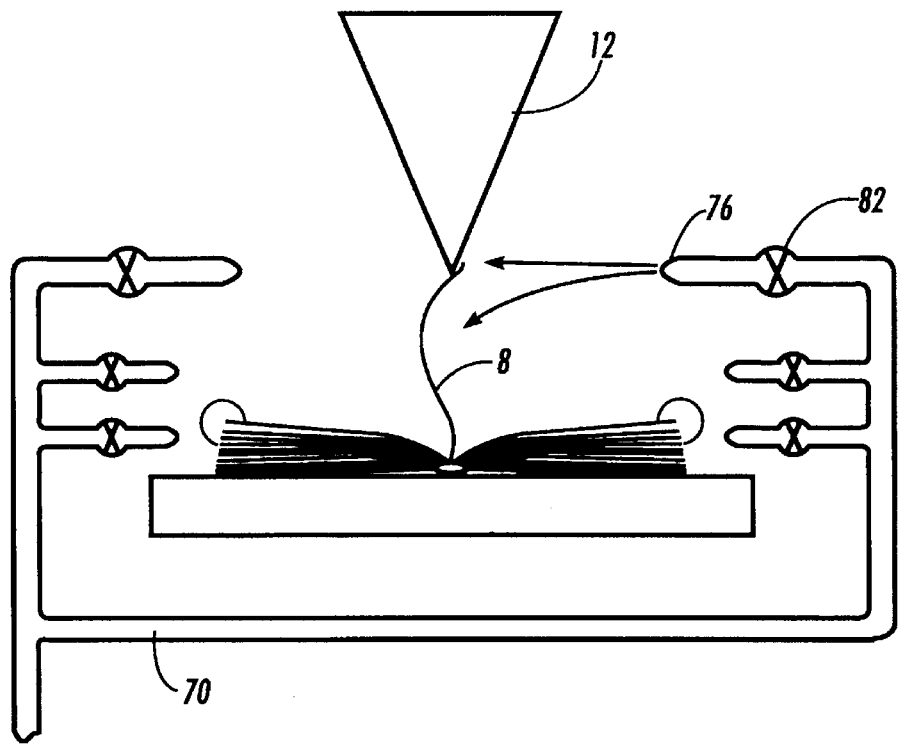
Figure 9:
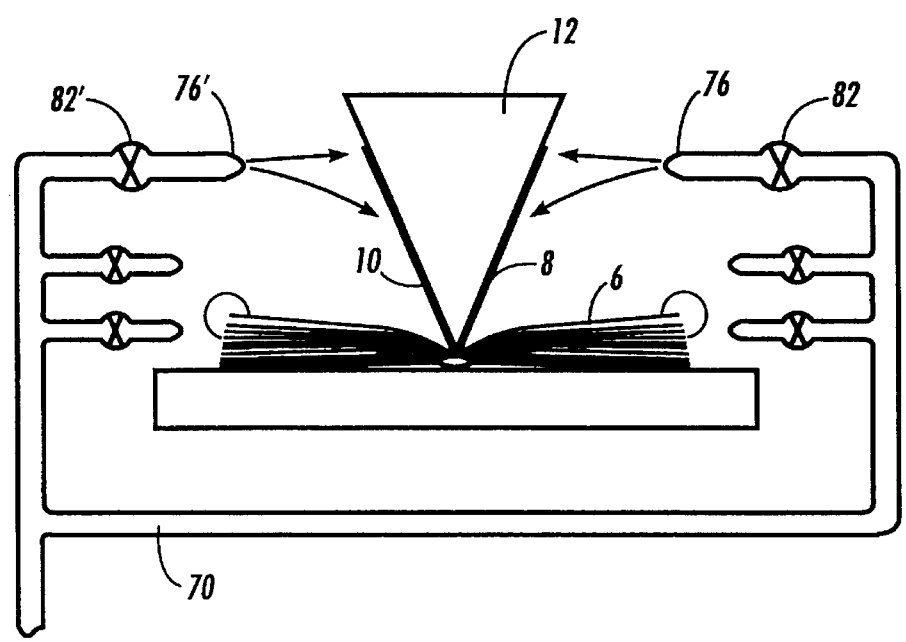
Figure 10:
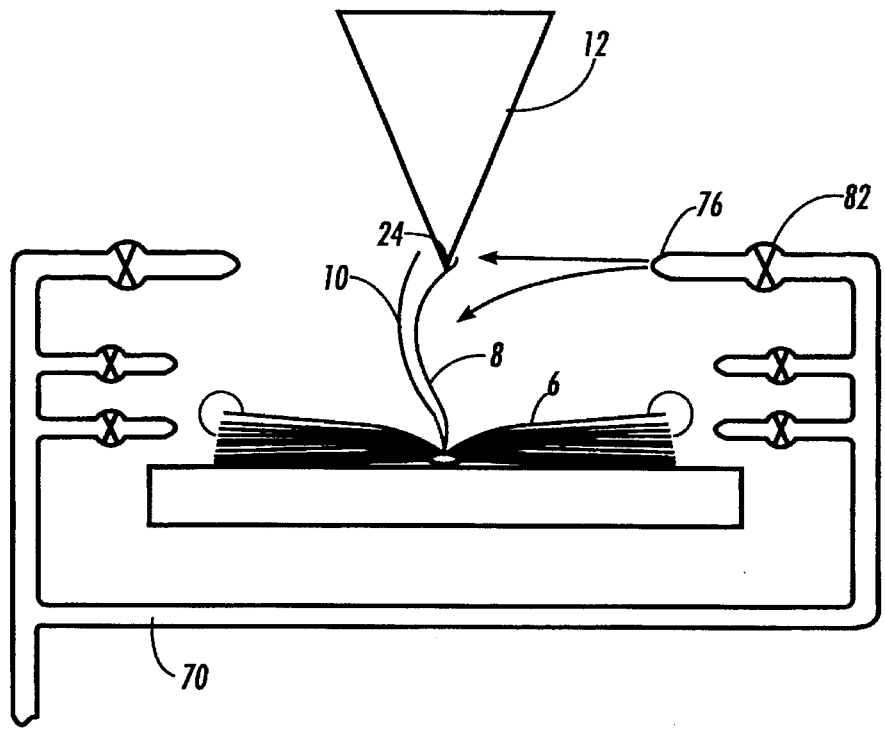
Figure 11:
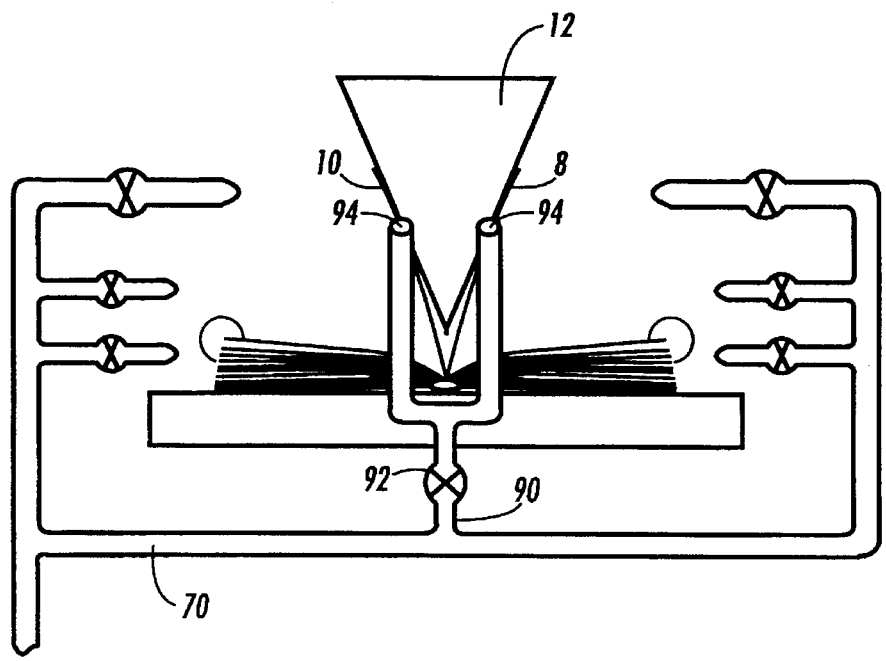
FIG. 11 is a schematic representations of an air jet page release option.
Figure 12:
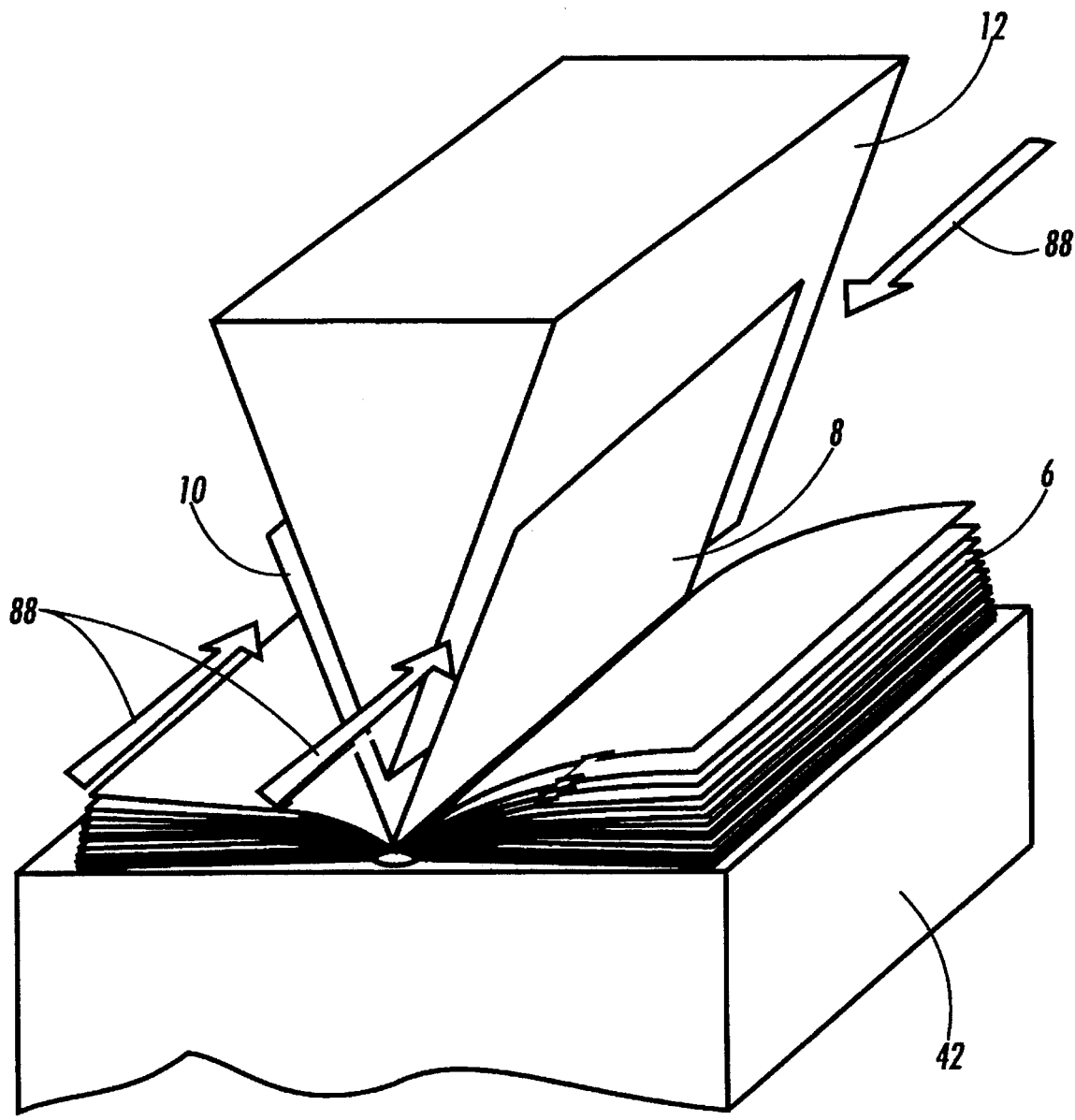
FIG. 12 is a perspective view of the page release air jets in operation.

Turning now to FIGS. 5 through 10, the operation of the air jet page turning system will be described. To begin, when it is desired to capture the images of a sequence of pages, for example, a chapter of a book, the book is opened to the first page to be imaged and is placed upon the carriage 42 and appropriately aligned thereon. At the initiation of operation, the imaging device 12 is located in its raised, rest position, as illustrated in FIG. 5. Pages are shown being turned from right to left, but it should be understood that this system is equally capable of turning pages from left to right, if such is desired.

To start the page turning operation, imaging device 12 is lowered and control valve 78 is opened, allowing a diffuse air jet to exit nozzle 72 and to be directed at the right side edges of the pages. This will cause the pages to fluff or separate, and will continue until optical sensor 84 detects that the topmost sheet 8 has been elevated sufficiently to enable the next air jet to capture it. At that point, a feedback signal is generated, which is used to partially open control valve 80 for allowing an air jet to exit nozzle 74 (see FIG. 6) so as to pick-off page 8 from the remainder of the fluffed pages, while closing control valve 78 and allowing the remainder of the fluffed pages to settle back onto the book. Then the valve 80 is fully opened to drive the page towards the imaging device. Next, control valve 82 is opened allowing a broad air jet to exit nozzle 76 (see FIG. 7) and to urge the page into intimate contact with the surface of the imaging device so that the first side of the page may be read by the detector array 18. Following imaging, the imaging device is raised and continued application of the air jet from nozzle 76 pushes the page thereunder (see FIG. 8) to turn it to the left side. Then the air jet is terminated and the page falls onto the left side of the book under the influence of gravity. Finally, control valve 82 is closed and the imaging device is lowered.

After having imaged the first side of the first page, the second side of that page and the first side of a subsequent page may be imaged by following the same series of steps as set forth above, with the addition of the application of air jets from the left side. Thus, the pages of both the right and left sides of the book are fluffed by air jets emanating from nozzles 72 and 72' (not shown), followed by sensing the elevation of the top page and picking-off thereof by air jets emanating from nozzles 74 and 74' (not shown), and subsequently urging the pages into intimate contact with the surfaces 18 and 20 of the imaging device by air jets 76 and 76' (see FIG. 9). Then air jet 76' is terminated as the imaging device is raised, leaving air jet 76 to push both pages past the apex of the imaging device (see FIG. 10). Once past the apex, the air jet 76 is terminated and both pages fall to the left side of the book under the influence of gravity. The page turning sequence is complete and may be repeated as often as required to complete an imaging task. The entire sequence can be accomplished in about one second. It is possible to achieve a faster page turning speed by continuously maintaining the control valves 78 and 78' open, keeping the pages fluffed at all times.

Forcing the opposed pages are into intimate contact with the surfaces of the imaging device 12 by means of the air jets from nozzles 76 and 76' causes an intimate bond to occur therebetween even after the air jets are extinguished. Thus, when the imaging device is retracted (between FIGS. 9 and 10) there is a high likelihood that the pages may abrade the surfaces of detector arrays 18 and 20 and that the pages may be damaged. This problem may be overcome by the alternative embodiment illustrated in FIG. 11, wherein the pages are released from the imaging device by air jets 88, as shown schematically in FIG. 12. To this end, there is provided an additional air line 90, connected to manifold 70, in which a control valve 92 is located to control the delivery of air to a pair of end-on nozzles 94. After imaging, when it is time to retract the imaging device, the control valve is opened and air jets are directed at the top edge of the pages releasing the bond and moving the pages away from the imaging device. As a further alternative construction, it is contemplated to provide a similar pair of release nozzles positioned to direct air at the bottom edge of the pages (also shown in FIG. 12).

Figure 13:
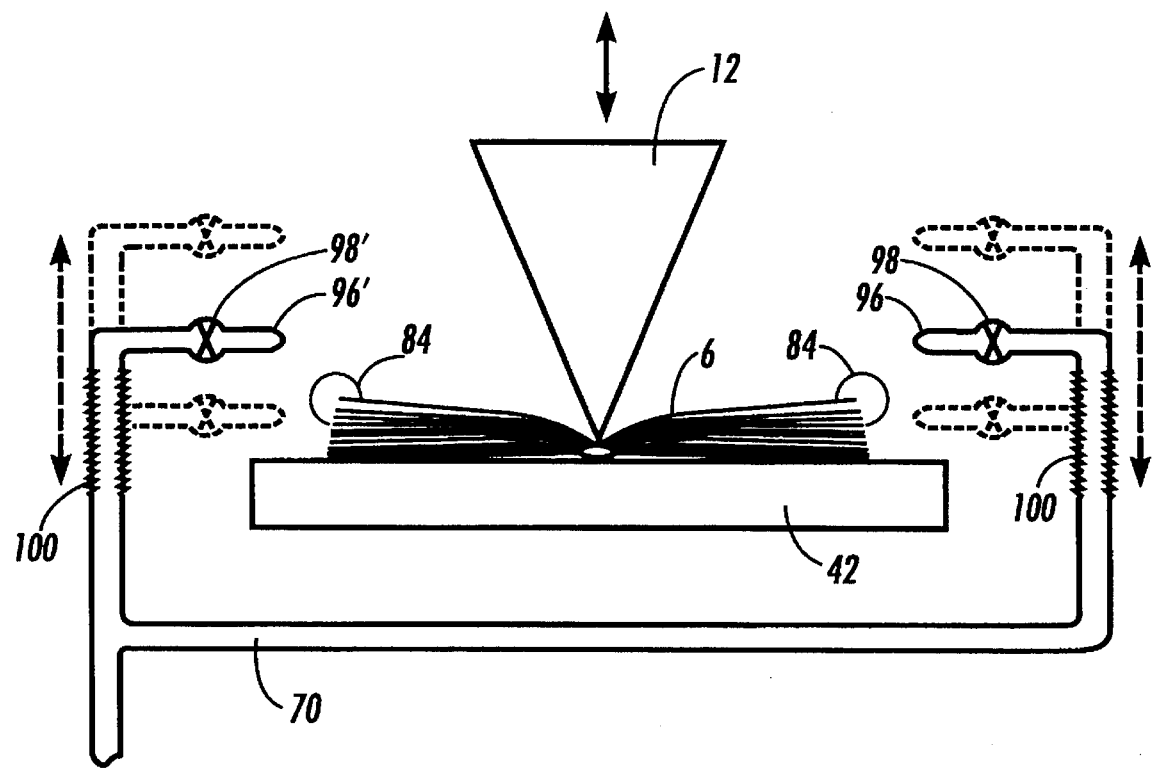
FIG. 13 is a schematic representation of an alternative embodiment of the air jet page turning system.

While the air jet page turning system has been illustrated and described with respect to an array of nozzles, it is also contemplated that this invention could be carried out with an apparatus comprising a single nozzle adjacent the right and left sides of the book, as shown in FIG. 13. Pressurized air is provided to the single nozzle 96, 96', metered by control valve 98, 98' through manifold 70 and flexible hose 100, 100'. As illustrated in dotted lines in the Figure, the nozzle may be repositioned in a timed sequence in conjunction with the energization of the control valve to perform the desired functions of fluffing the pages, picking-off the topmost page from said fluffed pages, applying a force for urging the topmost page into intimate contact with said imaging device and turning the topmost page by driving it to the opposite side of the book.

It should be understood that it may not be desired to image each pair of pages of a book and that it is possible to program the controller such that a single page may be selected for imaging. Furthermore, the controller may be programmed to turn multiple, consecutive, pages independently of imaging in order to present for imaging the desired pages.

It will be appreciated that the present invention is not limited to the design or the specific orientation of the preferred embodiment, and that structures equivalent to those described hereinabove are encompassed within the scope of the present invention. For example, it is contemplated that the book may be placed on a suitable support in a partially open, inverted, page-down position, and the drive assembly may move an imaging device normally positioned below the support, upwardly toward the book. Although a wedge-shaped imaging device has been described, it is within the scope of the present invention to construct the wedge at as small an angle as is feasible in order to accommodate the substrate thickness and the illumination sources.

What is claimed:

1. A book imager, comprising:

a support upon which a book may be positioned in an open state so as to expose a pair of book pages;

an imaging device having a pair of imaging surfaces each being capable of capturing a two-dimensional digital representation of a page;

a drive assembly, positioned with respect to said support and said imaging device to impart relative movement therebetween so that said support and said imaging device are relatively movable from a first position to a second position, such that in the first position, said imaging device is located in close proximity to said support to enable imaging of at least one page of the book, and in the second position, said imaging device is located sufficiently remote from said support to enable a page of the book to be turned; and an air jet page turning system for advancing one page at a time, said system including a fluffing jet for separating pages, a pick-off jet for separating the topmost page from said fluffed pages, a force applying jet for urging the topmost page into intimate contact with said imaging device and a page turning jet for driving the topmost page to the opposite side of the book.

2. The book imager according to claim 1 wherein each of said fluffing jet, said pick-off jet, said force applying jet and said page turning jet is connected to a source of pressurized air.

3. The book imager according to claim 1 wherein each of said fluffing jet, said pick-off jet, said force applying jet and said page turning jet comprises a nozzle and a control valve for metering the flow of air through said nozzle.

4. The book imager according to claim 1 wherein each of said fluffing jet, said pick-off jet, said force applying jet and said page turning jet is directed toward a side edge of the book.

5. The book imager according to claim 1, further comprising a page position sensor capable of generating a signal indicative of the height of the topmost fluffed page.

6. The book imager according to claim 5 wherein said page position sensor is an optical sensor.

7. The book imager according to claim 1, further comprising a page release jet for loosening the bond between a page and said imaging device.

8. The book imager according to claim 7 wherein said page release jet is connected to a source of pressurized air and comprises a nozzle and a control valve for metering the flow of air through said nozzle.

9. The book imager according to claim 7 wherein said page release jet is directed toward either the top or bottom edge of the bonded page.

10. The book imager according to claim 7 wherein said page release jet is directed toward both the top and bottom edges of the bonded page.

11. The book imager according to claim 1 wherein a single nozzle and control valve for metering the flow of air through said nozzle is movable to a first position to dispense said fluffing jet, is movable to a second position to dispense said pick-off jet, and to a third position to dispense said force applying jet and said page turning jet.

12. A method of imaging pages of a book comprising the steps of:

supporting a book upon a support in an open position;

imparting relative motion, in a first direction, between said support and an imaging device having imaging surfaces disposed at an angle, of less than 180 degrees, so as to bring said imaging surfaces into close proximity to the book;

fluffing the pages of the book by means of an air jet:

picking-off the topmost page of the fluffed pages by means of an air jet;

driving the topmost page toward and into intimate contact with the imaging surfaces by means of an air jet;

capturing a two-dimensional representation of one side of the topmost page;

imparting relative motion, in a direction opposite to said first direction, between said support and said imaging device so as to move said imaging surfaces away from said book; and turning the page by driving it to the opposite side of the book by means of an air jet.

13. The method according to claim 12 further comprising the step of sensing the elevation of the fluffed pages and effecting said step of picking-off the topmost page when the topmost page has reached predetermined elevation.

14. The method according to claim 12 wherein each of said steps of fluffing, picking-off, driving and turning is effected by directed an air jet at the side edge of the book.

15. The method according to claim 12 further including the step of releasing the bond between the page and an imaging surface.

16. The method according to claim 15 wherein said step of releasing is accomplished as said support and imaging device are moved relatively in said opposite direction.

17. The method according to claim 15 wherein said step of releasing is effected by directing an air jet toward either the top or bottom edge of the bonded page.

18. The method according to claim 15 wherein said step of releasing is effected by directing an air jet toward both the top and bottom edges of the bonded page.

* * * * *